United States Patent
Han

(10) Patent No.: US 10,037,183 B2
(45) Date of Patent: Jul. 31, 2018

(54) METHOD OF INTERACTING FRAMES BETWEEN MULTIPLE ELECTRONIC DEVICES AND ELECTRONIC SYSTEM THEREOF

(71) Applicant: Wistron Corporation, New Taipei (TW)

(72) Inventor: Xiao-Yun Han, New Taipei (TW)

(73) Assignee: Wistron Corporation, New Taipei (TW)

( * ) Notice: Subject to any disclaimer, the term of this patent is extended or adjusted under 35 U.S.C. 154(b) by 285 days.

(21) Appl. No.: 14/942,998

(22) Filed: Nov. 16, 2015

(65) Prior Publication Data

US 2016/0313967 A1    Oct. 27, 2016

(30) Foreign Application Priority Data

Apr. 22, 2015    (CN) .......................... 2015 1 0194738

(51) Int. Cl.
| | |
|---|---|
| *G06F 3/14* | (2006.01) |
| *G06F 3/041* | (2006.01) |
| *G06F 3/0487* | (2013.01) |
| *G06F 3/0488* | (2013.01) |
| *G06F 1/16* | (2006.01) |

(52) U.S. Cl.
CPC .......... *G06F 3/1446* (2013.01); *G06F 1/1626* (2013.01); *G06F 1/1684* (2013.01); *G06F 3/0487* (2013.01); *G06F 3/0488* (2013.01); *G09G 2356/00* (2013.01)

(58) Field of Classification Search
None
See application file for complete search history.

(56) References Cited

U.S. PATENT DOCUMENTS

| | | | |
|---|---|---|---|
| 2010/0113148 A1 | 5/2010 | Haltovsky | |
| 2013/0214995 A1* | 8/2013 | Lewin | ................... G06F 3/1446 345/1.3 |
| 2015/0379964 A1* | 12/2015 | Lee | ......................... G09G 5/12 345/173 |

* cited by examiner

*Primary Examiner* — Benjamin C Lee
*Assistant Examiner* — Krishna Neupane
(74) *Attorney, Agent, or Firm* — Winston Hsu

(57) ABSTRACT

A method of interacting frames between multiple electronic devices for a first electronic device includes determining if a first frame of the first electronic device and a second frame of a second electronic device toward a same direction when the first electronic device detects an approaching or contact from the second electronic device to operate in an extend mode or a clone mode. If the first and second electronic devices operate in the extend mode, the first and second electronic devices collaboratively display one of the first and second frames being a dominant frame; if the first and second electronic devices operate in the clone mode, the first and second electronic devices respectively display one of the first and second frames being the dominant frame.

20 Claims, 14 Drawing Sheets

METHOD OF INTERACTING FRAMES BETWEEN MULTIPLE ELECTRONIC DEVICES AND ELECTRONIC SYSTEM THEREOF

BACKGROUND OF THE INVENTION

1. Field of the Invention

The present invention relates to a method of interacting frames between multiple electronic devices and electronic system thereof, and more particularly, to a method of interacting frames between multiple electronic devices and electronic system thereof for determining a relative position between multiple electronic devices and corresponding display modes when they are approaching or connecting to each other.

2. Description of the Prior Art

As electronic technology advances, various portable electronic devices such as tablet computers or smart phones are widely used in daily life. The tablet computer has many advantages such as small size, light weight, easy manipulation and versatile functions (e.g., take photos, surf the Internet, documentations, receive and send E-mail, and so on) to become popular to the people.

However, limited by its small size, a screen of the tablet computer could be too small for watching and reading. For example, videos and characters displayed by the screen could be too small to cause visual fatigue. It is inconvenient for users to enlarge the videos and characters. In addition, multiple users may have difficulties in watching the screen with small size, which becomes an obstacle to the users in sharing information when using the tablet computer. Therefore, there is a need to improve the prior art.

SUMMARY OF THE INVENTION

It is therefore an objective of the present invention to provide a method of interacting frames between multiple electronic devices and electronic system thereof for determining a relative position between multiple electronic devices and corresponding display modes when they are approaching or connecting to each other.

The present invention discloses a method of interacting frames between multiple electronic devices for a first electronic device. The method includes determining whether a first frame of the first electronic device and a second frame of a second electronic device face a same direction when the first electronic device detects an approach or a contact from the second electronic device; determining the first electronic is able to operate in an extend mode if the first frame and the second frame face the same direction; or, determining the first electronic is able to operate in a clone mod if the first frame and the second frame face different directions; determining whether the first frame is a dominant frame; and displaying a first portion of the first frame by the first electronic device and sharing a second portion of the first frame to the second electronic device to replace second frame when the first frame is the dominant frame and the first electronic is able to operate in the extend mode, wherein the first frame is collaboratively displayed by the first and second electronic devices; or receiving a first portion of the second frame from the second electronic device to replace the first frame when the first frame is not the dominant frame and the first electronic is able to operate in the extend mode; or copying the first frame to the second electronic device to replace the second frame when the first frame is the dominant frame and the first electronic is able to operate in the clone mode; or receiving the second frame from the second electronic device by the first electronic device to replace the first frame when the first frame is not the dominant frame and the first electronic is able to operate in the clone mode.

The present invention further discloses an electronic system including a first electronic device and a second electronic device for interacting with the first electronic device. The first electronic device and the second electronic device respectively comprises a memory device for storing a program code to indicate the first electronic device and the second electronic device executing a process of interacting frames. The process of interacting frames includes determining whether a first frame of the first electronic device and a second frame of a second electronic device face a same direction when the first electronic device detects an approach or a contact from the second electronic device; determining the first electronic is able to operate in an extend mode if the first frame and the second frame face the same direction; or, determining the first electronic is able to operate in a clone mod if the first frame and the second frame face different directions; determining whether the first frame is a dominant frame; and displaying a first portion of the first frame by the first electronic device and sharing a second portion of the first frame to the second electronic device to replace second frame when the first frame is the dominant frame and the first electronic is able to operate in the extend mode, wherein the first frame is collaboratively displayed by the first and second electronic devices; or receiving a first portion of the second frame from the second electronic device to replace the first frame when the first frame is not the dominant frame and the first electronic is able to operate in the extend mode; or copying the first frame to the second electronic device to replace the second frame when the first frame is the dominant frame and the first electronic is able to operate in the clone mode; or receiving the second frame from the second electronic device by the first electronic device to replace the first frame when the first frame is not the dominant frame and the first electronic is able to operate in the clone mode.

These and other objectives of the present invention will no doubt become obvious to those of ordinary skill in the art after reading the following detailed description of the preferred embodiment that is illustrated in the various figures and drawings.

DETAILED DESCRIPTION

To broaden applications for electronic devices whose screen sizes are relatively small such as tablet computers or mobile phones, the present invention provides a function of interactive frames for the electronic devices. Take the tablet computers for example, there may be multiple position detectors disposed on sides or bezels of the tablet computers for generating detection results when the tablet computers approach or connect to each other, so the tablet computers may determine a combination (or relative position) of themselves according to the detection results to select one of a display modes for sharing frames or cooperating with each other, once the function of interactive frames is activated by users. For example, if the function of interactive frames is activated by the users, the tablet computers may select one of the display modes from an extend mode, a clone mode and a virtual laptop mode. On the contrary, if the function of interactive frames is deactivated by users, the tablet computers may operate in an independent mode.

Take two tablet computers for example, if the function of interactive frames is activated by the users and the two tablet computers operate in the extend mode, a frame displayed by one of the two tablet computers may be divided into two portions which are respectively displayed by the two tablet computers; in other words, the frame may be extended or shared from one tablet computer to another to be collaboratively displayed by the two tablet computer. When the two tablet computers operate in the clone mode, a frame displayed by one tablet computer may be copied to another; in other words, the two tablet computer may simultaneously display the same frame. When the two tablet computers operate in the virtual laptop mode, one tablet computer may operate as a display device of a laptop computer, while another tablet computer may operate as a key board or an input interface, thereby the two tablet computers may cooperate and interact with each other to work as the laptop computer. On the contrary, when the two tablet computers operate in the independent mode, they may respectively display its original frames once the function of interactive frames is deactivated by users.

As a result, a size of the frame that the tablets computer can display may be effectively increased by using the extend mode, which mitigates the visual fatigue to the users due to the small frame. In addition, the frame may be shared by using the clone mode. Or, a laptop computer may be achieved by combining the two tablet computers, which brings convenience to the users for typing and documentation. The two tablet computers may cooperate and interact with each other to share frames, which brings convenience to the users, mitigates the visual fatigue, and facilitates sharing information when using the tablet computer.

Figure 1:
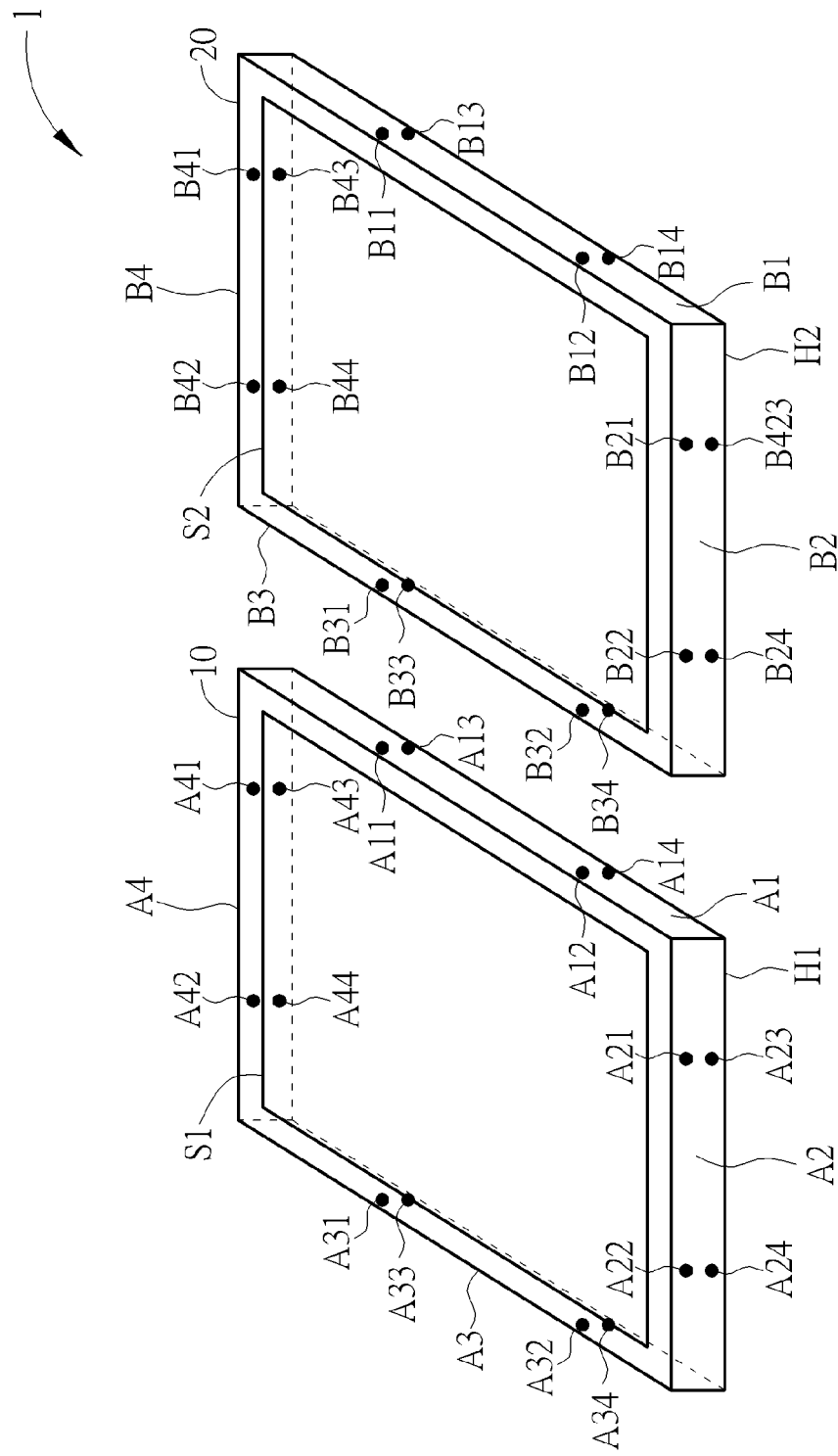
FIG. 1 is a schematic diagram of a display system according to an embodiment of the present invention.

Please refer to FIG. 1, which is a schematic diagram of a display system 1 according to an embodiment of the present invention. The display system 1 includes at least two tablet computers 10 and 20. The tablet computers 10 and 20 may be disposed adjacent or connected to each other to form a display wall, an E-book or a laptop computer. The tablet computers 10 and 20 may be any electronic devices having display panels S1 and S2 for displaying a first frame and a second frame, respectively. In other embodiments, the tablet computers 10 and 20 may take places of a smart phone, an E-album, or a television. Position detectors A11, A12, A13 and A14 may be disposed at a first side A1 of the tablet computer 10, position detectors A21, A22, A23 and A24 may be disposed at a second side A2 of the tablet computer 10, position detectors A31, A32, A33 and A34 may be disposed at a third side A3 of the tablet computer 10, and position detectors A41, A42, A43 and A44 may be disposed at a fourth side A4 of the tablet computer 10. Similarly, position detectors B11, B12, B13 and B14 may be disposed at a first side B1 of the tablet computer 20, position detectors B21, B22, B23 and B24 may be disposed at a second side B2 of the tablet computer 20, position detectors B31, B32, B33 and B34 may be disposed at a third side of the tablet computer 20, and position detectors B41, B42, B43 and B44 may be disposed at a fourth side B4 of the tablet computer 20. When the tablet computer 20 approaches or is connected to the tablet computer 10, since the tablet computers 10 and 20 are equipped with the position detectors and structurally identical, their position detectors may respectively generate a detection result to determine a combination or relative location of themselves, so the tablet computers 10 and 20 may selectively operate in the display mode associated with the combination or relative location.

The position detectors may be a connector or a proximity sensor with various types such as capacitive, magnetic, photoelectric, or sonar proximity sensors. In this embodiment, the position detectors are connectors for example. Take the tablet computer 10 for example, a combination of the position detectors A11, A12, A13 and A14 may be regarded as a connector, wherein each of the position detectors A11, A12, A13 and A14 may be regarded as a pin of the connector. Therefore, four connectors may be respectively disposed at the fourth sides A1-A4 of the tablet computer 10 for detecting the whether the four connectors are connected to other connectors to determine the display mode. The tablet computers 10 and 20 may determine which sides are connected according to pin definitions and their detection results (e.g. changes in voltage levels of the pins due to separation and connection), so as to determine the display mode.

Figure 2:
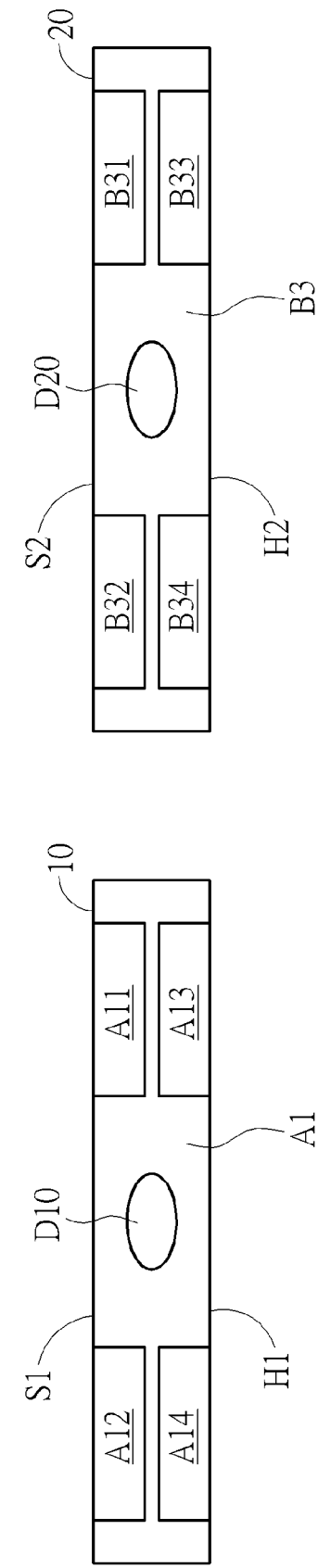
FIG. 2 illustrates a side view of the two tablet computers shown in FIG. 1.

Please refer to FIG. 2, which illustrates a side view of the two tablet computers 10 and 20. In one embodiment, assume that the position detectors A11 and A12 disposed adjacent to a screen S1 and the position detectors B31 and B32 and S2 disposed adjacent to a screen S2 indicate a high voltage level, and position detectors A13 and A14 disposed adjacent to a back cover H1 and position detectors B33 and B34 disposed adjacent to a back cover H2 indicate a low voltage level. Under the circumstance that the function of interactive frames is activated by the users, the screens S1 and S2 face a same direction if the position detectors A11, A12, B31 and B32 indicate the high voltage level after the electronic devices 10 and 20 are connected or approached to each other. On the contrary, the screens S1 and S2 face opposite directions if the position detectors A11, A12, B31 and B32 indicate the low voltage level after the electronic devices 10 and 20 are connected or approached to each other. In another embodiment, assume that the position detectors A11, A13, B31 and B33 indicate a high voltage level, and the position detectors A12, A14, B32 and B34 indicate a low voltage level. The screens S1 and S2 face a same direction if the position detectors A11, A12, B31 and B33 indicate the high voltage level after the electronic devices 10 and 20 are connected or approached to each other. On the contrary, the screens S1 and S2 face opposite directions if position detectors A11, A13, B31 and B33 indicate the low voltage level after the electronic devices 10 and 20 are connected or approached to each other. As a result, the tablet computers 10 and 20 may determine which sides are connected according to changes in the voltage levels of the position detectors.

Moreover, a data transmission port D10 may be disposed at the first side A1 of the tablet computer 10, and a data transmission port D20 may be disposed at the third side B3 of the tablet computer 20. A wired connection may be made by the data transmission ports D10 and D20 after the first side A1 of the tablet computer 10 are approached or connected to the third side B3 of the tablet computer 20, wherein the wired connection may be achieved by universal serial bus (USB) or Ethernet. In practice, the data transmission port D10 may be disposed at each of the four sides A1-A4 of the tablet computer 10, and the data transmission port D20 may be disposed at each of the four sides B1-B4 of the tablet computer 20, so the wired connection may be made at any sides of the tablet computers 10 and 20.

In other embodiments, wireless connections may be made between multiple tablet computers to share frames, wherein the wireless connections may be achieved by Ultra Wide Band (UWB), Bluetooth, Wi-Fi or infrared-ray technology. Preferably, the UWB technology has advantages such as easy implementation, low power consumption, multipath recognition, precise positioning and high data rate (over 500 Mbits per second within 10 meters), thereby the UWB technology is suitable for wireless communication for short distances. Moreover, the wireless connections may prevent the tablet computers from hardware damages due to frequently plug-in and plug-out, which reduces malfunctions of the tablet computers and extends a product lifecycle of the tablet computers. In practice, the tablet computers 10 and 20 may be equipped with a wireless communication module for making the wireless connections from any directions.

Figure 3A:
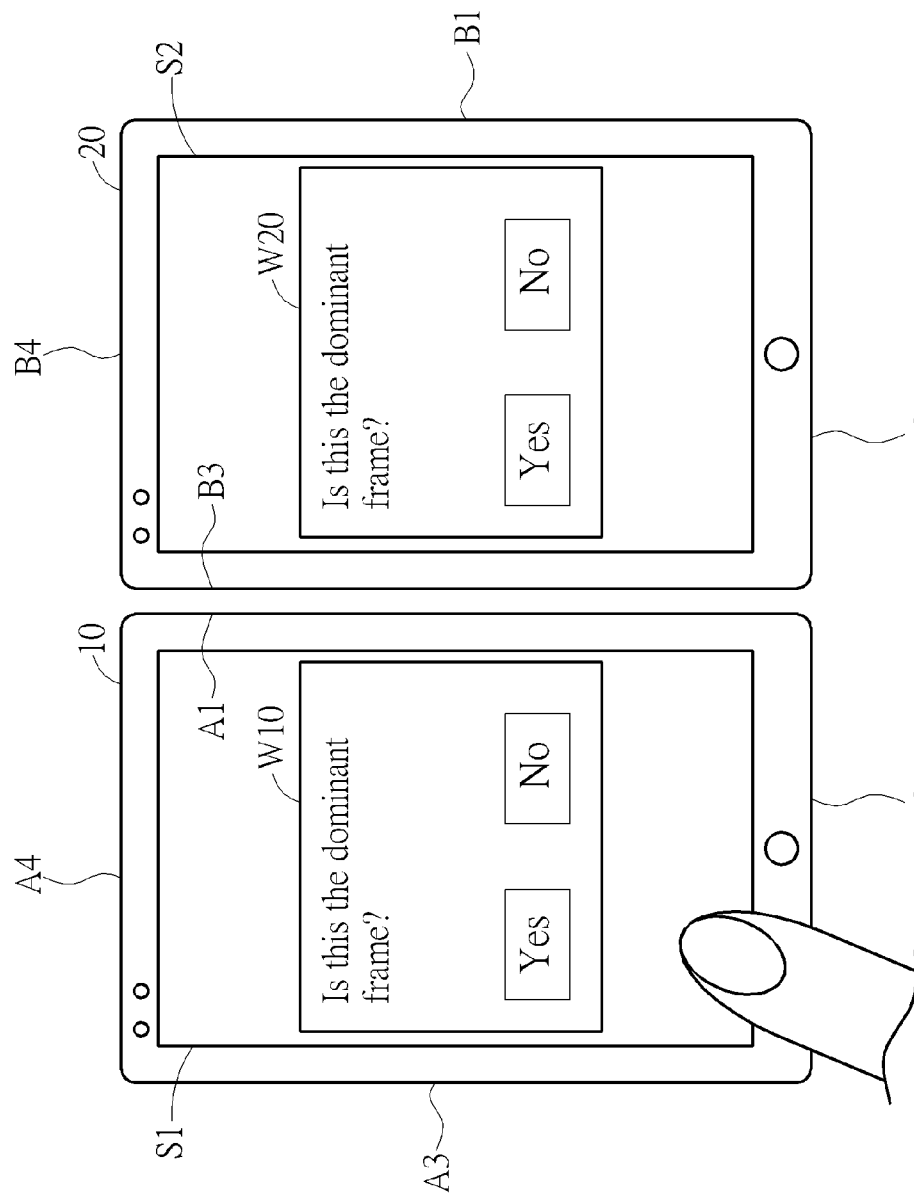
FIG. 3A and FIG. 3B illustrate operations of an extend mode.
Figure 3B:
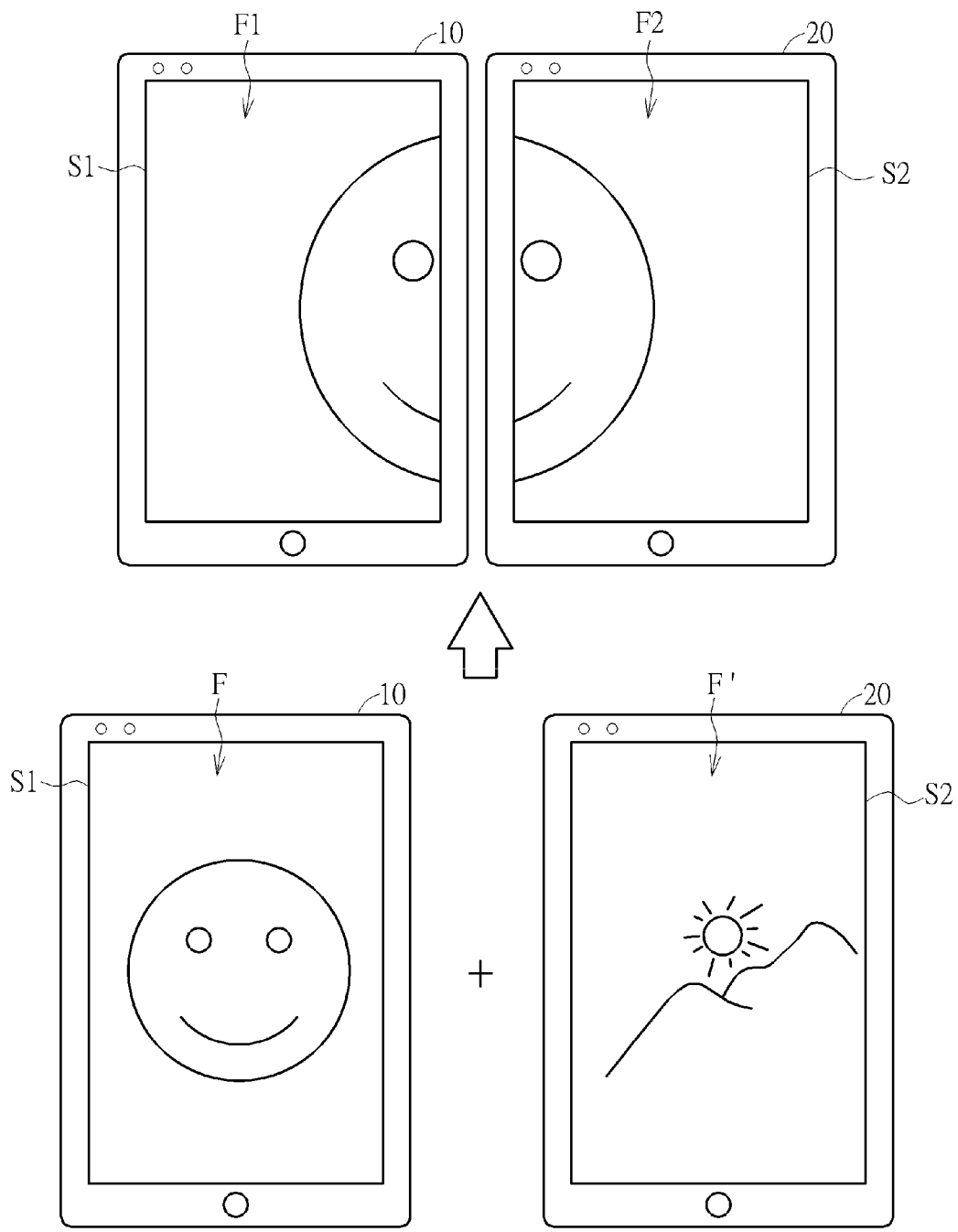

Please refer to FIG. 3A and FIG. 3B, which illustrate operations of the extend mode. Note that a prerequisite for operating in the extend mode is that both screens of the tablet computers 10 and 20 face the same direction and lie at a same horizontal level, so that the first frame displayed by the screen of the tablet computer 10 may be extended to the tablet computer 20, or the second frame displayed by the screen of the tablet computer 20 may be extended to the tablet computer 10. As shown in FIG. 3A, when the tablet computers 10 and 20 are disposed side by side (the first side A1 and the third side B3 are connected or approached) and their screens face the same direction and lie at the same horizontal level, the position detectors A11, A12, A13 and A14 may respectively contact with the position detectors B31, B32, B33 and B34 (a combination that long sides are connected), and the tablet computers 10 and 20 may determine that they can operate in the extend mode according to detection results from the position detectors A11, A12, A13, A14, B31, B32, B33 and B34. Then, the tablet computers 10 and 20 may be combined to form a screen having a wider width. In another embodiment, when the tablet computers 10 and 20 are disposed side by side (the second side A2 and the second side B2 are connected or approached) and their screens face the same direction and lie at the same horizontal level, the position detectors A21, A22, A23 and A24 may respectively contact with the position detectors B22, B21, B24 and B23 (a combination that short sides are connected), and the tablet computers 10 and 20 may determine that they can operate in the extend mode. Then, the tablet computers 10 and 20 may be combined to form a screen having a taller height. Unlimitedly, when the tablet computers 10 and 20 are disposed side by side (the first side A1 and the second side B2 are connected or approached) and their screens face the same direction and lie at the same horizontal level, and the tablet computers 10 and 20 may determine that they can operate in the extend mode. Then, the tablet computers 10 and 20 may be combined to form a screen having a T-shape. In short, the extend mode may be determined as long as the detection results of the position detectors indicate that the screens of the tablet computers 10 and 20 face the same direction and lie in the same horizontal level.

Once the extend mode is determined, the tablet computers 10 and 20 may respectively show identical inquiry windows W10 and W20 for querying which one of the frames frame displayed by the tablet computers 10 and 20 is a dominant frame. The inquiry windows W10 and W20 may display "Is this the dominant frame?" and selections "Yes" and "No". The frame displayed by the tablet computer 10 may be the dominant frame if the selection "Yes" of the inquiry window W10 is selected by the user. Meanwhile, the tablet computer 20 may automatically determine that the selection "No" of the inquiry window W20 is selected by the users if the selection "Yes" of the inquiry window W10 is selected, which may be achieved by the connection between the data transmission ports D10 and D20, and thus determine the frame displayed by the tablet computer 20 is a submissive frame. In another embodiment, the frame displayed by the tablet computer 10 may be the submissive frame if the selection "No" of the inquiry window W10 is selected by the user. Meanwhile, the tablet computer 20 may automatically determine that the selection "Yes" of the inquiry window W20 is selected by the users if the selection "No" of the inquiry window W10 is selected, so as to determine the frame displayed by the tablet computer 20 is the dominant frame.

As shown in FIG. 3B, assume that first frame F displayed by the tablet computer 10 is the dominant frame, the tablet computer 10 may divide the first frame F into a first portion F1 and a second portion F2, wherein the first portion F1 may be displayed by the tablet computer 10, and the second portion F2 may be transmitted to the tablet computer 20 to be displayed by the tablet computer 20. Therefore, the second portion F2 of the first frame F may be shared to the tablet computer 20. In another embodiment, assume that the first frame F displayed the tablet computer 10 is the submissive frame, the tablet computer 10 may receive a second portion of the second frame F' of the tablet computer 20 to display the second portion of the second frame F'. Therefore, the second portion of the second frame F' may be shared to the tablet computer 10. Note that the second frame F' includes a first portion and a second portion, and the tablet computer 20 may display the first portion if the second portion is displayed by the tablet computer 10 display. As a result, the first frame F or the second frame F' may be extend to the tablet computers 20 and 10 to be collaboratively displayed by the tablet computers 20 and 10, which effectively increases a size of the first frame F or the second frame F' to mitigate the visual fatigue.

Figure 4A:
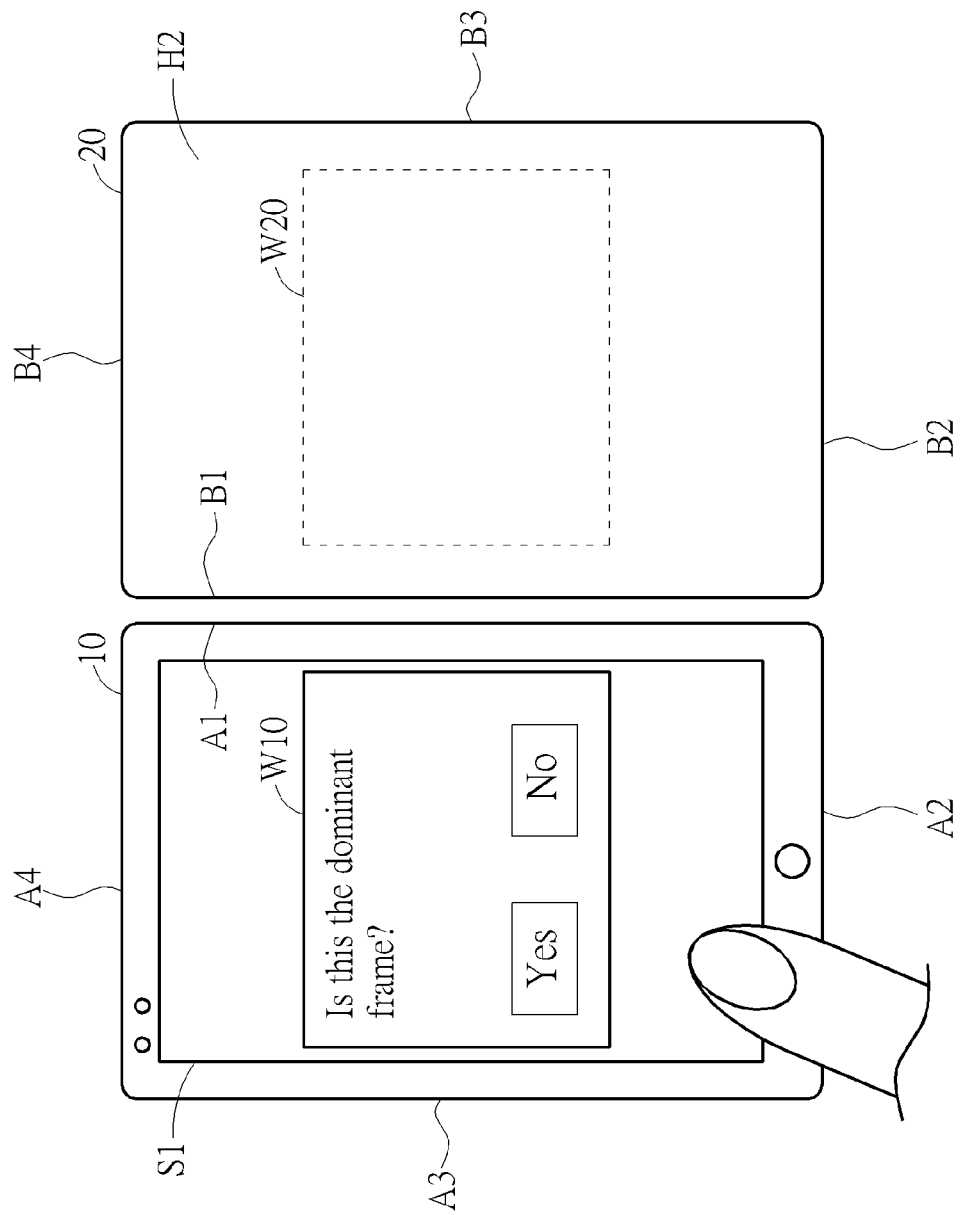
FIG. 4A and FIG. 4B illustrate operations of a clone mode.
Figure 4B:
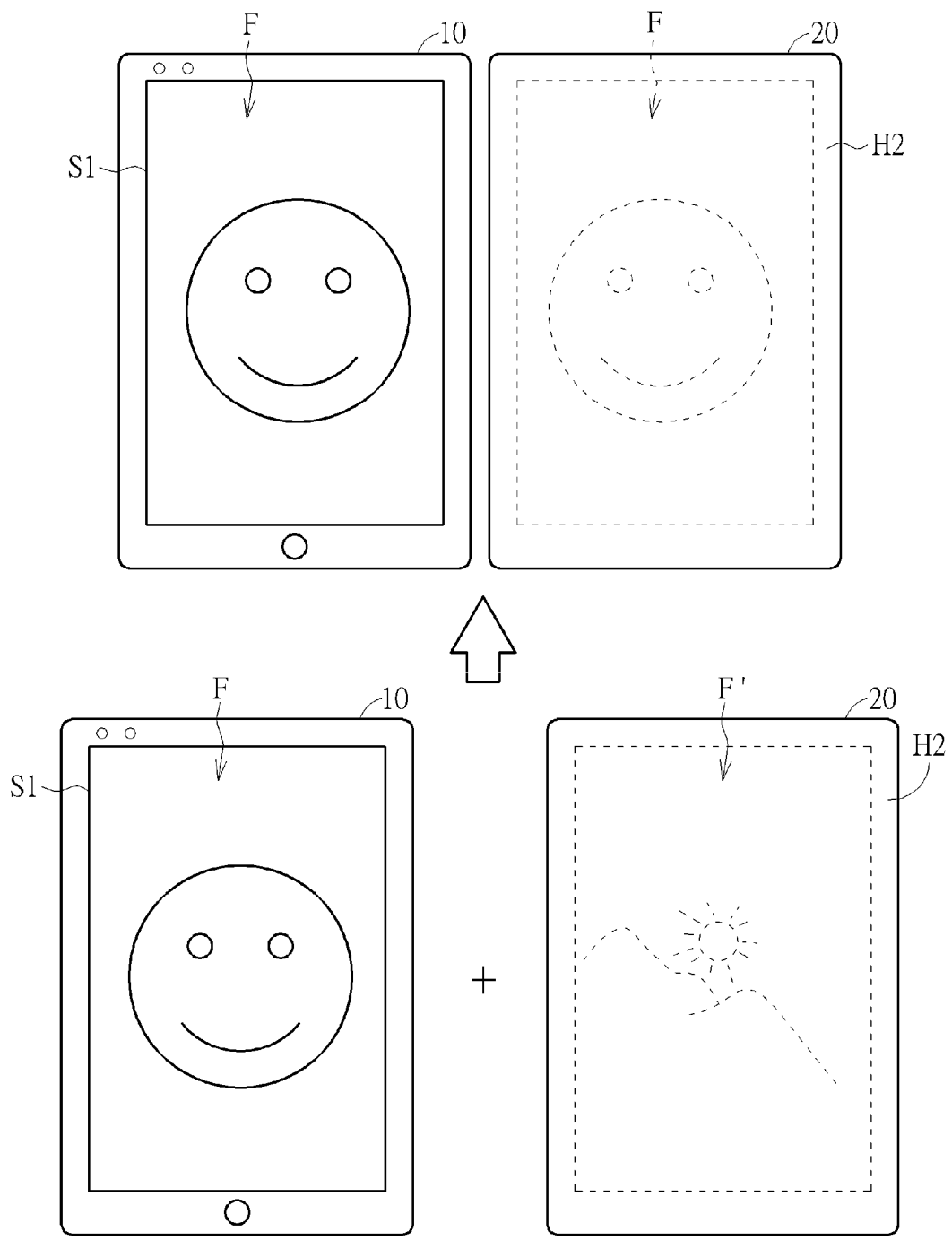

Please refer to FIG. 4A to FIG. 4B, which illustrate operations of the clone mode. Note that a prerequisite for operating in the clone mode is that the screens of the tablet computers 10 and 20 face opposite directions. In such a situation, the first frame F of the tablet computer 10 may be the dominant frame to be copied to the tablet computer 20 instead of being extended to the tablet computer 20, while the second frame F' of the tablet computer 20 may be the submissive frame to be replaced by the dominant frame. In practice, the clone mode may be suitable for users sitting face to face to share frames. One of the frames F or F' displayed by the tablet computers 10 or 20 may be copied to replace the other as long as their screens are placed sided by side and facing different directions.

For example, as shown in FIG. 4A, when the tablet computers 10 and 20 are disposed facing different direction (e.g., the screen S1 of the tablet computer 10 face up and the screen S2 of the tablet computer 20 face down, and the first side A1 and first side B1 are connected or approached), the position detectors A11, A12, A13 and A14 may respectively contact with the position detectors B13, B14, B11 and B12 (a combination that long sides are connected), and the tablet computers 10 and 20 may determine that they can operate in the clone mode according to detection results from the position detectors A11, A12, A13, A14, B13, B14, B11 and B12. In an embodiment, when the tablet computers 10 and 20 are disposed facing different direction (e.g., the screen S1 of the tablet computer 10 face up and the screen S2 of the tablet computer 20 face down, and the first side A2 and first side B2 are connected or approached), the position detectors A21, A22, A23 and A24 may respectively contact with the position detectors B23, B24, B21 and B22 (a combination that short sides are connected), and the tablet computers 10 and 20 may determine that they can operate in the clone mode. Unlimitedly, when the tablet computers 10 and 20 are disposed facing different direction (e.g., the screen S1 of the tablet computer 10 face up and the screen S2 of the tablet computer 20 face down, and the first side A2 and first side B1 are connected or approached), the position detectors 21, A22, A23 and A24 may respectively contact with the position detectors B13, B14, B11 and B12 (a combination that a short side and a long side are connected to form a T-shape), and the tablet computers 10 and 20 may determine that they can operate in the clone mode. In short, the clone mode may be determined as long as the detection results of the position detectors indicate that the screens of the tablet computers 10 and 20 face different directions.

Once the clone mode is determined, the tablet computers 10 and 20 may respectively show identical inquiry windows W10 and W20 for querying which one of the frames displayed by the tablet computers 10 and 20 is a dominant frame, which allows the user to determine whether to copy the first frame F of the tablet computer 10 to the tablet computer 20, or copy the second frame F' of the tablet computer 20 to the tablet computer 10. For example, as shown in FIG. 4B, the first frame F of the tablet computer 10 may be copied to the tablet computer 20 (denoted with dash lines), thereby the user may share a same frame with others by using the clone mode.

Figure 5A:
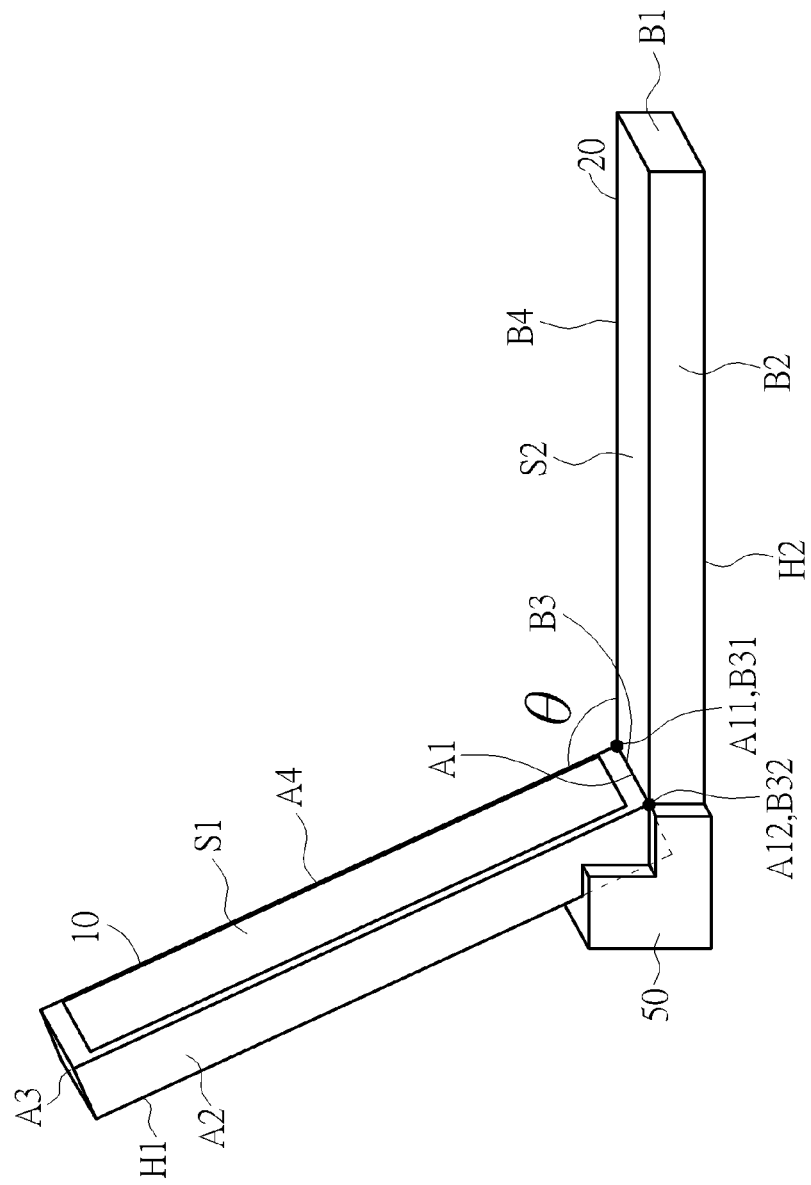
FIG. 5A to FIG. 5C illustrate operations of a virtual laptop mode.
Figure 5B:
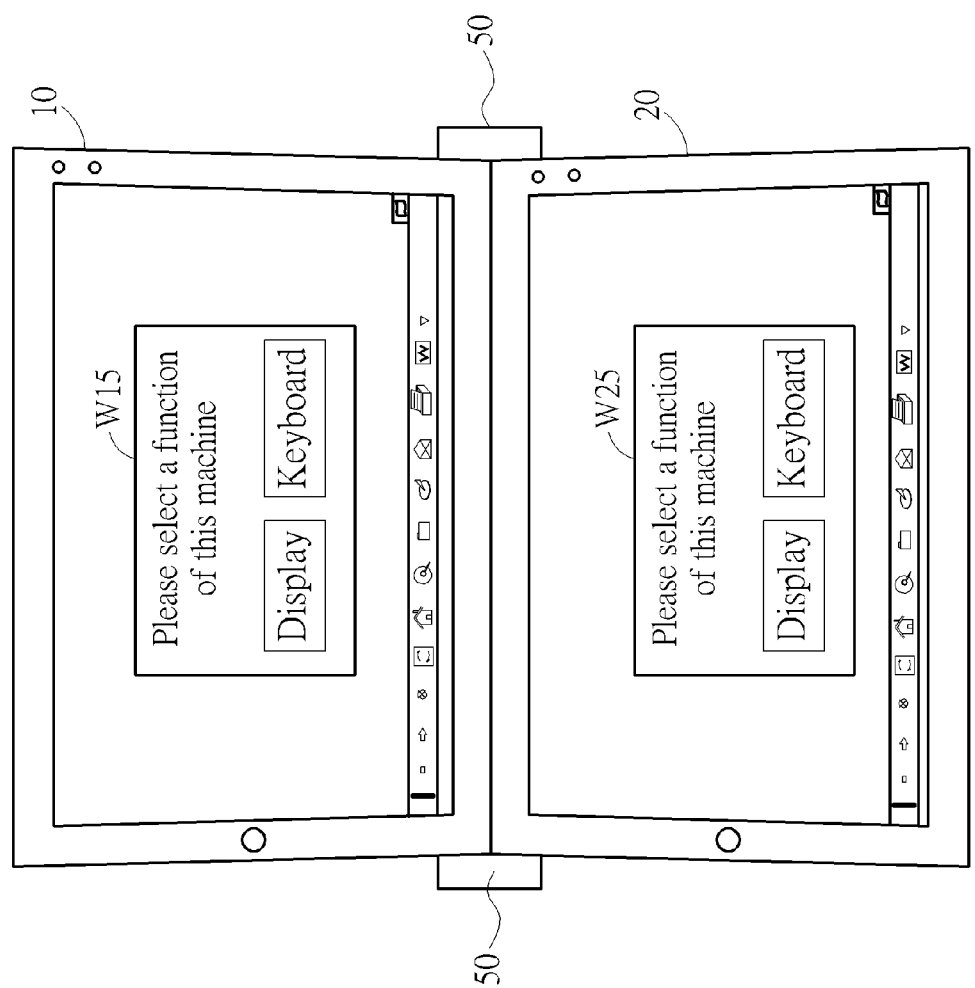
Figure 5C:
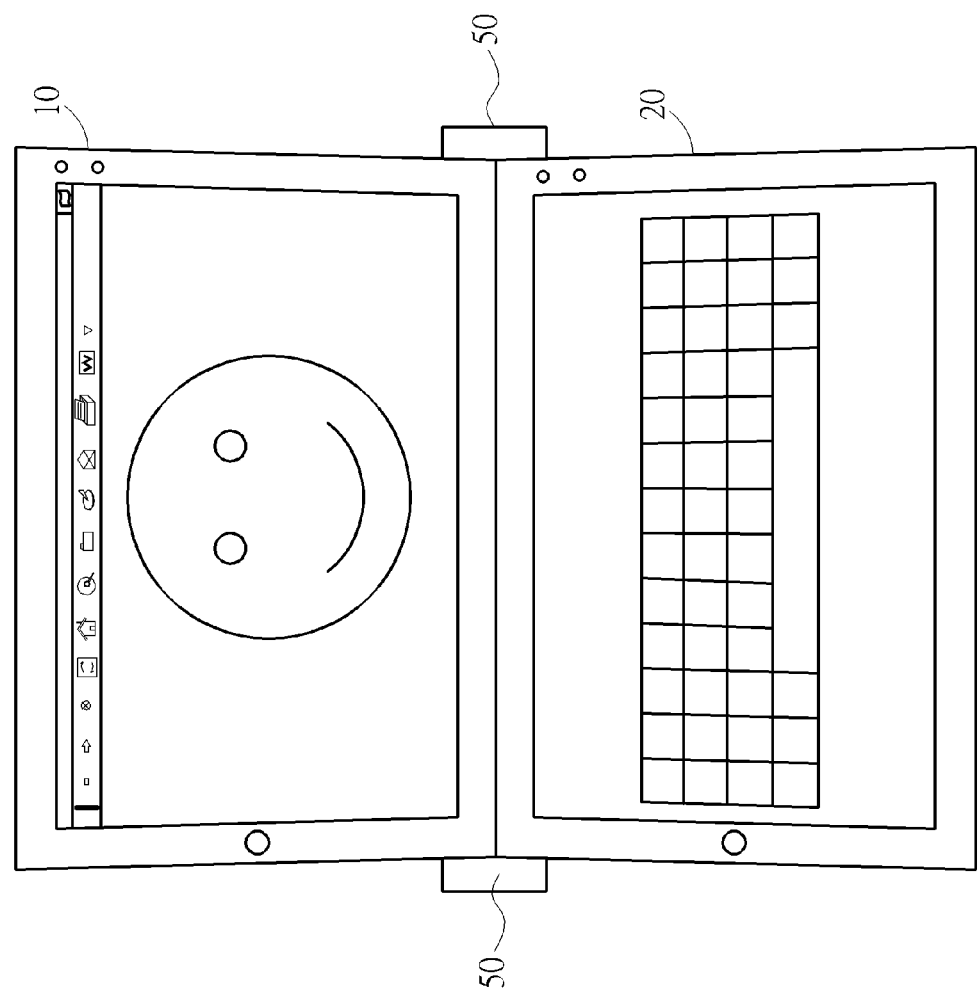

Please refer to FIG. 5A to FIG. 5C, which illustrate operations of the virtual laptop mode. Note that a prerequisite for operating in the virtual laptop mode is that the screens of the tablet computers 10 and 20 face opposite directions and lie at different horizontal levels (i.e., there is an angle θ between the screens S1 and S2 of the tablet computers 10 and 20 to mimic a laptop computer). As shown in FIG. 5A, when the first side A1 of the tablet computer 10 connects or approaches to the third side B3 of the tablet computer 20 and there is the angle θ between the screens S1 and S2, the position detectors A11 and A12 adjacent to the screen S1 may contact or detect the position detectors B31 and B32 adjacent to the screen S2, respectively. The position detectors A13 and A14 adjacent to the back cover H1 at the first side A1 may separate from or be out of detection ranges of the position detectors A33 and A34 adjacent to the back cover H2 at the third side B3. Therefore, the tablet computers 10 and 20 may determine that they can operate in the virtual laptop mode according to the detection results of the position detectors A11, A12, B31 and B32. In other words, only two position detectors at one side of the tablet computers 10 and 20 can detect or connect to other detectors and generate detection results due to the angle θ between the screens S1 and S2 of the tablet computers 10 and 20.

As shown in FIG. 5B, once the virtual laptop mode is determined, the tablet computers 10 and 20 may respectively show identical inquiry windows W15 and W25 for querying which one of the frames displayed by the tablet computers 10 and 20 is a display or a keyboard. The inquiry window W15 and W25 may display "Please select a function of this machine" and selections "Display" and "Keyboard". The tablet computer 10 may work as a display device for displaying its frame if the user selects the selection "Display" of the inquiry window W15. Meanwhile, the tablet computer 20 may automatically determine that the selection "Keyboard" of the inquiry window W25 is selected by the users if the selection "Display" of the inquiry window W15 is selected, which may be achieved by the connection between the data transmission ports D10 and D20, and thus determine the tablet computer 20 works as a keyboard. In another embodiment, the tablet computer 10 may work as a keyboard if the user selects the selection "Keyboard" of the inquiry window W15. Meanwhile, the tablet computer 20 may automatically determine that the selection "Display" of the inquiry window W25 is selected by the users if the selection "Keyboard" of the inquiry window W15 is selected, which may be achieved by the connection between the data transmission ports D10 and D20, and thus determine the tablet computer 20 works as a display for displaying its frame.

In addition, a holder 50 may be disposed between the tablet computers 10 and 20 for supporting the tablet computer being the display device and fixing the tablet computers 10 and 20, which brings convenience to the user when operating in the virtual laptop mode. Further, the holder 50 may be designed with a pivot or a hinge so that the tablet computers 10 and 20 may be opened flat to operate in the extend mode or clone mode.

As a result, as shown in FIG. 5C, the tablet computer 10 may work as a display device for displaying its frame, while the tablet computer 20 may work as a virtual keyboard or an input interface, thereby the user may combine the tablet computers 10 and 20 to be a laptop computer by using the virtual laptop mode.

In short, the present invention disposes multiple position detectors at sides or bezels of the tablet computers for generating detection results when the tablet computers approach or connect to each other, so the tablet computers may determine a combination (or relative position) of themselves according to the detection results to select one of a display modes (e.g., the extent, clone and virtual laptop modes). Therefore, various applications for the tablet computers or the smart phones with relatively small screen may be achieved. Those skilled in the art may make modifications or alterations according to the display system and the electronic device of the present invention, which is not limited.

For example, the position detectors may cooperate with other detection devices built-in the tablet computer to determine the combination between the two tablet computers, which may save a number of the position detectors. As can be seen from the above mentioned embodiments, the prerequisite for identifying the extend mode from the clone mode lies in whether the screens of the two tablet computers face a same direction, and the prerequisite for identifying the virtual laptop mode lies in whether there is the angle θ between the screens of the tablet computers 10 and 20. Therefore, there are at least two position detectors at each side of the tablet computers for identifying whether the screens face the same direction, and a G-sensor or gyroscope may be used for detecting the angle θ between the screens.

Figure 6:
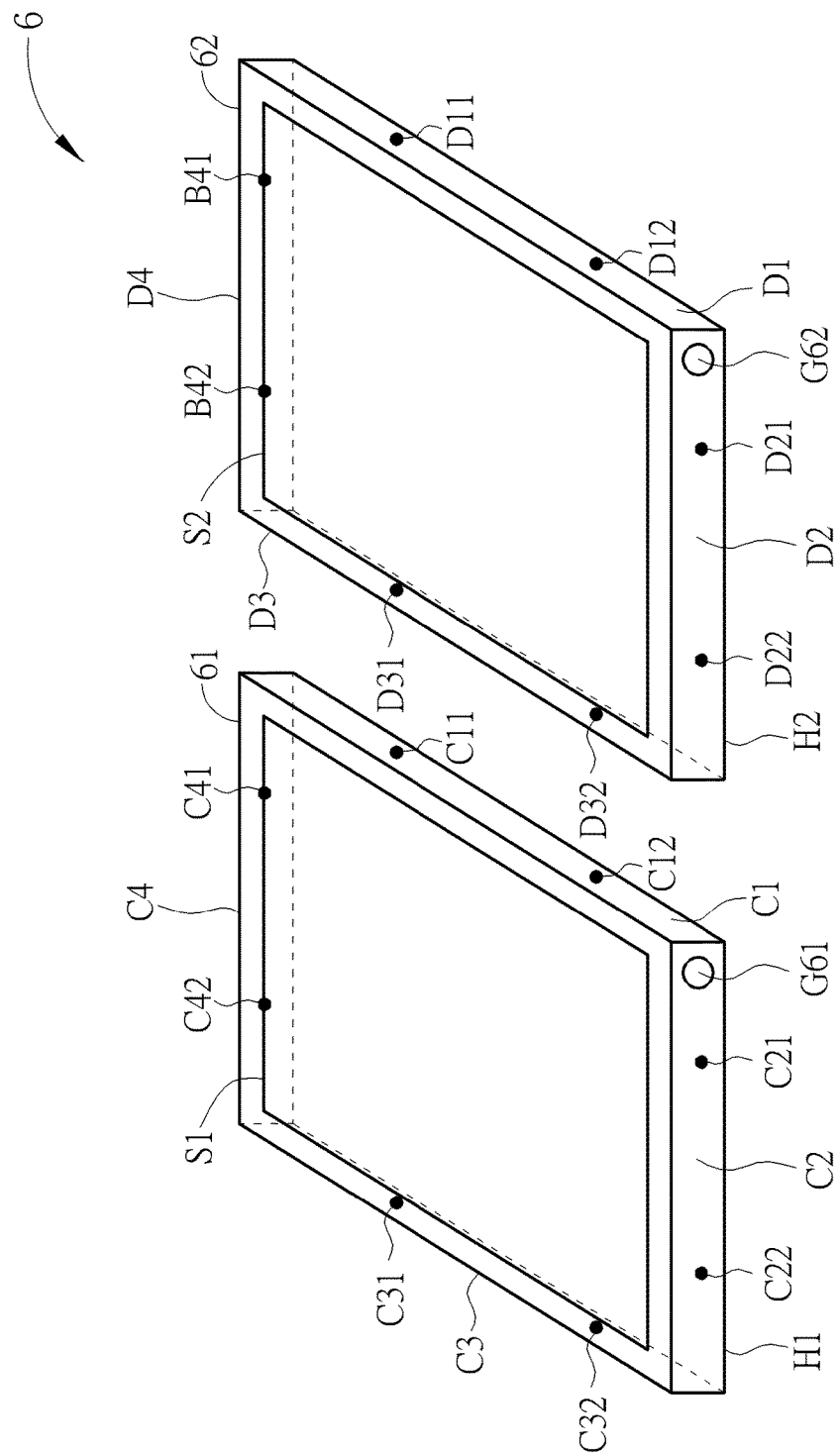
FIG. 6 is a schematic diagram of a display system according to another embodiment of the present invention.

Specifically, please refer to FIG. 6, which is a schematic diagram of a display system 6 according to another embodiment of the present invention. The display system 6 includes tablet computers 61 and 62, which may be disposed adjacent or connected to each other to form a display wall, an E-book or a laptop computer. The tablet computer 61 includes a G-sensor G61, wherein position detectors C11 and C12 may be disposed at a first side C1 of the tablet computer 61, position detectors C21 and C22 may be disposed at a second side C2 of the tablet computer 61, position detectors C31 and C32 may be disposed at a third side C3 of the tablet computer 61, and position detectors C41 and C42 may be disposed at a fourth side C4 of the tablet computer 61. Similarly, the tablet computer 62 includes a G-sensor G62, wherein position detectors D11 and D12 may be disposed at a first side D1 of the tablet computer 62, position detectors D21 and D22 may be disposed at a second side D2 of the tablet computer 62, position detectors D31 and D32 may be disposed at a third side D3 of the tablet computer 62, and position detectors D41 and D42 may be disposed at a fourth side D4 of the tablet computer 62.

In such a structure, the position detectors C11 and C12 may respectively connect or detect the position detectors D31 and D32 (or the position detectors D12 and D11, D22 and D21, D41 and D42) when the first side C1 of the tablet computer 61 approaches or connects to the third side D3 of the tablet computer 62, so the tablet computers 61 and 62 may determine their screens S1 and S2 face a same direction (e.g. face up) to be able to operate in the extend mode. On the contrary, the position detectors C11 and C12 may respectively connect or detect the position detectors D32 and D31 (or the position detectors D11 and D12, D21 and D22, D42 and D41) when the first side C1 of the tablet computer 61 approaches or connects to the third side D3 of the tablet computer 62, the tablet computers 61 and 62 may determine their screens S1 and S2 face different directions (e.g. one face up and the other face down) to be able to operate in the clone mode.

For identifying the virtual laptop mode, the tablet computers 61 and 62 may exchange detection results of the G-sensors G61 and G62 via a communication connection. The tablet computers 61 and 62 may determine there is the angle θ between their screens S1 and S2 to operate in the virtual laptop mode if the detections results from the position detectors indicate that the screens S1 and S2 of the tablet computers 61 and 62 face a same direction but the detection results of the G-sensors G61 and G62 indicate different horizontal levels. On the contrary, the tablet computers 61 and 62 may determine there is not the angle θ between their screens to operate in the extend mode if the detections results from the position detectors indicate that the screens S1 and S2 of the tablet computers 61 and 62 face a same direction but the detection results of the G-sensors G61 and G62 indicate a same horizontal level.

Therefore, referring to detection results from the position detectors and other detection devices (e.g., the G-sensor or gyroscope) built-in the tablet computer may identify the combination between the two tablet computers and one of the display modes. In the embodiment of FIG. 1, each tablet computer may require sixteen position detectors; while in the embodiment of FIG. 6, each tablet computer may require eight position detectors and one G-sensor, which reduces a number of the position detectors to simplify a circuit design of the tablet computer and reduce a production cost.

In addition, the users may manually change the display mode to select another display mode as they want. For example, the inquiry window may show additional selections "Other" or "Setup", and the tablet computer may popup another inquiry widow for additional options for the users when the selection "Other" or "Setup" is selected by the user.

Figure 7:
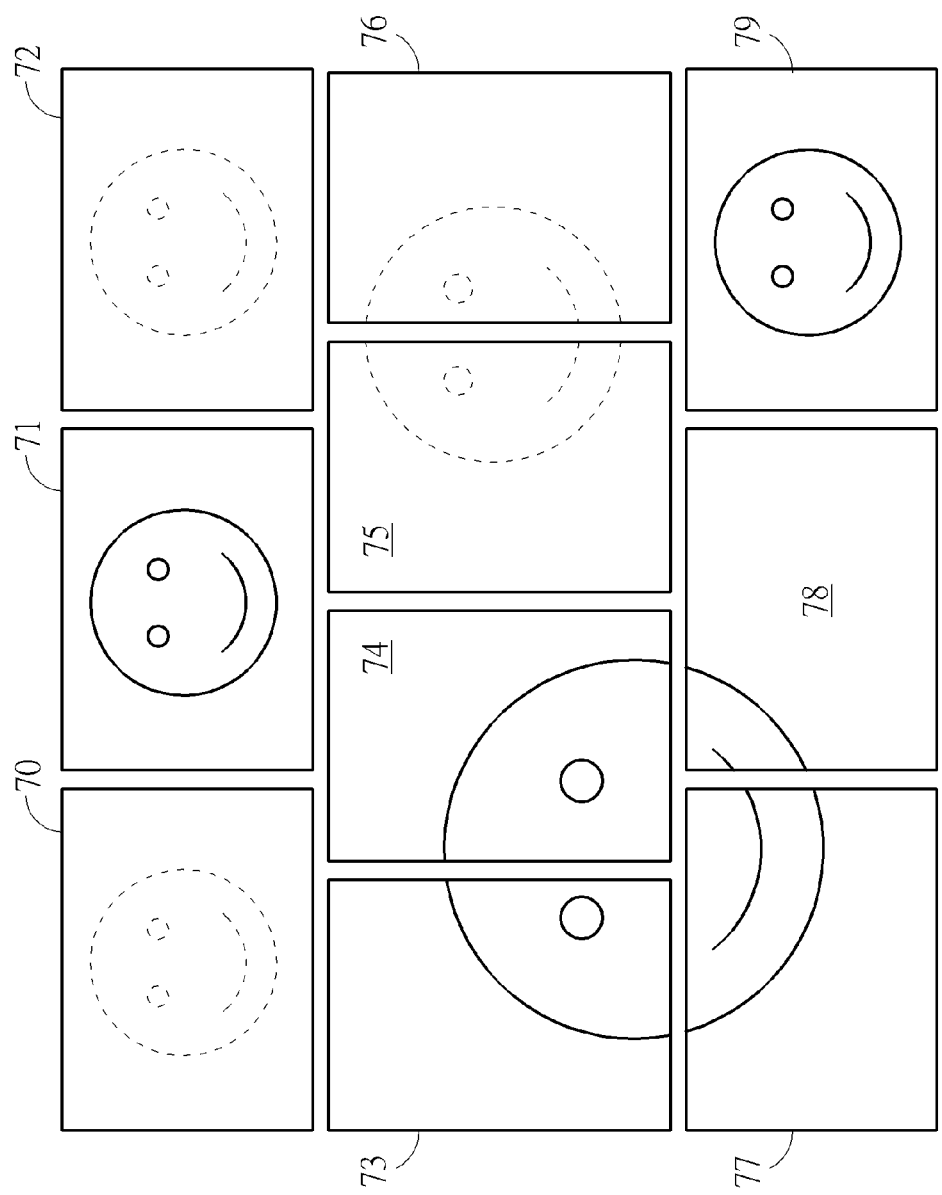
FIG. 7 is a schematic diagram of a display system according to another embodiment of the present invention.

In such a situation, a number of tablet computers which are combined and a way that the tablet computers are combined may be arbitrary. Please refer to FIG. 7, which is a schematic diagram of a display system 7 according to another embodiment of the present invention. The display system 7 includes tablet computers 70-79, which may be disposed adjacent or connected to each other to form a display wall. The tablet computers 73, 74, 77 and 78 may operate in the extend mode; the tablet computers 75 and 76 may operate in the extend mode; and the tablet computers 70, 71, 72 and 79 may operate in the clone mode. Therefore, the users may arbitrarily combine multiple tablet computers to form various display walls, which brings fun to the users.

Note that the embodiments above mentioned only shares one of the frames of the tablet computers, other functions of the tablet computers may operate independently. For example, under a circumstance that the tablet computer 10 is the dominant frame, the users may play or open files from the tablet computer 20. Or, users may edit a same file or different files on the tablet computers 10 and 20 at the same time.

Figure 8:
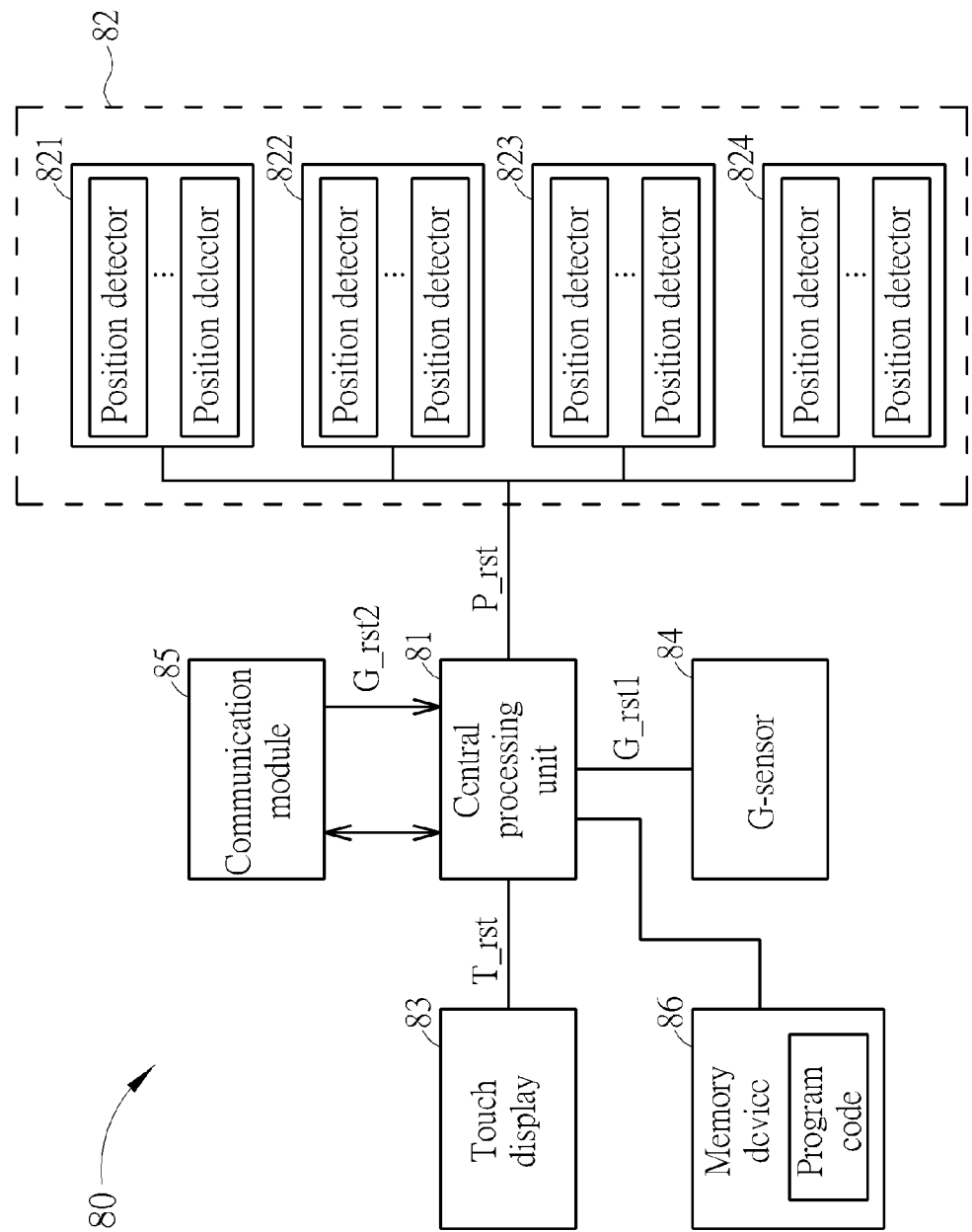
FIG. 8 is a functional block diagram of a tablet computer according to an embodiment of the present invention.

Please refer to FIG. 8, which is a functional block diagram of a tablet computer 80 according to an embodiment of the present invention. The tablet computer 80 may replace one of the tablet computers 10, 20, 61, 62 and 70-79 of the embodiments for determining one of the display modes from the extend mode, the clone mode and the virtual laptop mode. In structure, the tablet computer 80 includes a central processing unit 81, a position detection module 82, a touch display 83, a G-sensor 84, a communication module 85 and a memory device 86. The position detection module 82 includes position detecting units 821, 822, 823 and 824 disposed at four sides of the tablet computer 80, respectively. The position detecting units 821, 822, 823 and 824 may generate a detection result P_rst to the central processing unit 81, wherein the detection result P_rst indicates a relative position between multiple tablet computers. The touch display 83 may be composed of a display and a touch sensor for displaying a first frame and generating a detection result T_rst (e.g., touch detection result) to the central processing unit 81. The G-sensor 84 may be used for generating a detection result G_rst1 to the central processing unit 81. The communication module 85 may be used for performing wireless or wired communication to transmit the first frame of the tablet computer 80 to other tablet computers, or receiving a second frame and a detection result G_rst2 from other tablet computers. The central processing unit 81 may be coupled to the position detection module 82, the touch display 83, G-sensor 84, the communication module 85 and the memory device 86 for determining one of the display modes from the extend mode, the clone mode and the virtual laptop mode according to the detection results P_rst, G_rst1 and G_rst2, determining the frame displayed by the touch display 83 to be a dominant or a submissive frame, and determining the touch display 83 working as a display device or a virtual keyboard according to detection result T_rst. The memory device 86 may be used for storing a program code to indicate the central processing unit 81 executing frames sharing and cooperation between multiple tablet computers.

Assume the tablet computers 10 or 20 of the embodiment shown in FIG. 1 is replaced by the tablet computer 80, the central processing unit 81 may control the touch display 83 to display the inquiry window W10 or W20 (or the inquiry window W15 or W25) according to the detection result P_rst to receive the detection result T_rst. Then, the central processing unit 81 may determine the frame displayed by the touch display 83 to be a dominant or a submissive frame and determine the touch display 83 working as the device display or the virtual keyboard according to detection result T_rst.

In operation, when the detection result P_rst indicates the extend mode and the detection result T_rst indicates the dominant frame, the touch display 83 may display a first portion of the first frame. Meanwhile, the central processing unit 81 may transmit a second portion of the first frame to another tablet computer via the communication module 85, so as to extend the first frame to another tablet computer. When the detection result P_rst indicates extend mode and the detection result T_rst indicates the submissive frame, the central processing unit 81 may receive a second portion of a second frame via the communication module 85, and control the touch display 83 to display the second portion. The second frame may include a first portion and the second portion, wherein the first portion of the second frame may be displayed by the touch display 83 display first portion, and the second portion may be displayed by another tablet computer.

When the detection result P_rst indicates the clone mode and the detection result T_rst indicates the dominant frame, the touch display 83 may display the same first frame. Meanwhile, the central processing unit 81 may transmit the first frame to another tablet computer via the communication module 85 to copy the first frame to another tablet computer. When the detection result P_rst indicates the clone mode and the detection result T_rst indicates the submissive frame, the central processing unit 81 may receive the second frame via the communication module 85 to control the touch display 83 displaying the second frame.

When the detection result P_rst indicates the virtual laptop mode and the detection result T_rst indicates the display device, the touch display 83 may display the same frame. Meanwhile, the central processing unit 81 may receive a communication signal C_sig to read a keyboard command. When the detection result P_rst indicates the virtual laptop mode and the detection result T_rst indicates the keyboard, the central processing unit 81 may generate a display signal D_sig to the touch display 83 to change the first frame into a virtual keyboard.

Assume the tablet computers 61 or 62 of the embodiment shown in FIG. 6 is replaced by the tablet computer 80, the central processing unit 81 may control the touch display 83 to display the inquiry window W10 or W20 (or the inquiry window W15 or W25) according to the detection results P_rst, G_rst1 and G_rst2. The detection results G_rst1 and G_rst may indicate the horizontal levels of the tablet computers 61 or 62 to determine whether there is the angle θ between the tablet computers 61 or 62. Then, the central processing unit 81 may determine the frame displayed by the touch display 83 to be the dominant or the submissive frame and determine the touch display 83 working as the display device or the virtual keyboard according to detection result T_rst.

In operation, when the detection result P_rst indicates that the two screens face a same direction and the detection result G_rst1 is equal to the detection result G_rst2 (or a difference between the detection results G_rst1 and G_rst2 lies in a specific range), the tablet computer 80 may determine the extend mode. When the detection result P_rst indicates that the two screens face a same direction and the detection result G_rst1 is not equal to the detection result G_rst2 (or a difference between the detection result G_rst1 and G_rst2 is out of the specific range, i.e., there is the angle θ between the screens), the tablet computer 80 may determine the virtual laptop mode. When the detection result P_rst indicates that the two screens face different directions, the tablet computer 80 may determine the clone mode. Operations regarding sharing frames may be obtained by referring to above descriptions, which is omitted.

Figure 9:
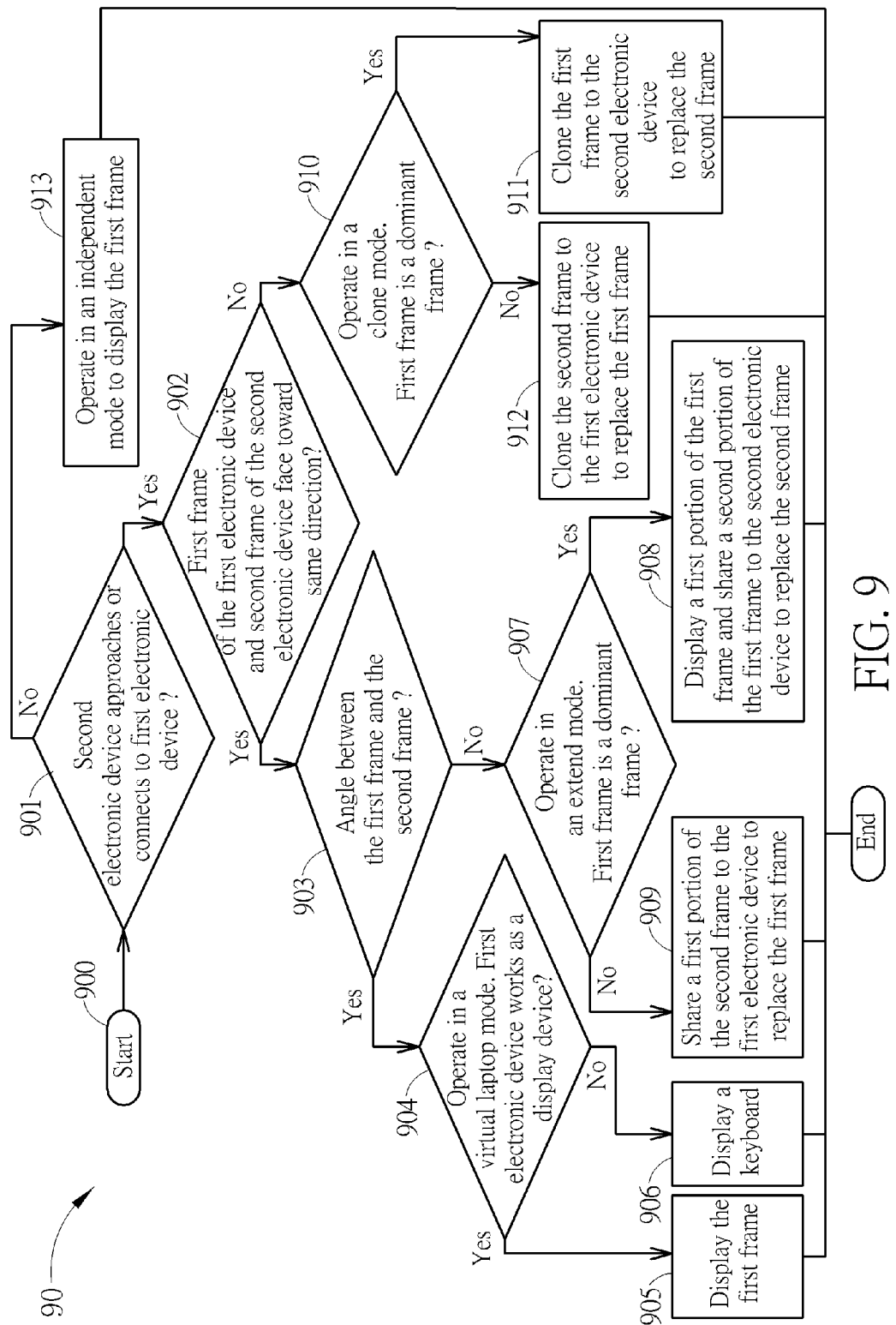
FIG. 9 is a flow chart of a process according to an embodiment of the present invention.

Operations of interacting and sharing frames between multiple electronic devices may be summarized into a process of interacting frames 90 for a first electronic device as shown in FIG. 9. The process of interacting frames 90 may be complied into a program code and include the following steps.

Step 900: Start.

Step 901: Determine whether a second electronic device approaches or connects to a first electronic device. Go to Step 902 if yes; go to Step 913 if no.

Step 902: Determine whether a first frame of the first electronic device and a second frame of the second electronic device face toward a same direction. Go to Step 903 if yes; Go to Step 910 if no.

Step 903: Determine whether there is an angle between the first frame and the second frame. Go to Step 904 if yes; go to Step 907 if no.

Step 904: Operate in a virtual laptop mode to determine whether the first electronic device works as a display. Go to Step 905 if yes; Go to Step 905 if no.

Step 905: Display the first frame. End.

Step 906: Display a keyboard. End.

Step 907: Operate in an extend mode to determine whether the first frame is a dominant frame. Go to Step 908 if yes; go to Step 909 if no.

Step 908: Display a first portion of the first frame and share a second portion of the first frame to the second electronic device to replace the second frame. End.

Step 909: Share a first portion of the second frame to the first electronic device to replace the first frame. End.

Step 910: Operate in a clone mode to determine whether the first frame is a dominant frame. Go to Step 911 if yes; Go to Step 912 if no.

Step 911: Clone the first frame to the second electronic device to replace the second frame. End.

Step 912: Clone the second frame to the first electronic device to replace the first frame. End.

Step 913: Operate in an independent mode to display the first frame.

Step 914: End.

Detailed descriptions for operations regarding the process of interacting frames 90 may be obtained by referring to embodiments as mentioned above, which is omitted.

The embodiments of the present invention describes operations of the two tablet computers operating in the extend mode and the clone mode for sharing frames and the virtual laptop mode for cooperation. In one embodiment of the present invention, the two tablet computers may operate in either the extend mode or the clone mode (i.e. the virtual laptop mode may be excluded), herein Step 903 to Step 906 may be omitted, and Step 907 may be performed if Step 902 is determined to be "Yes".

Figure 10:
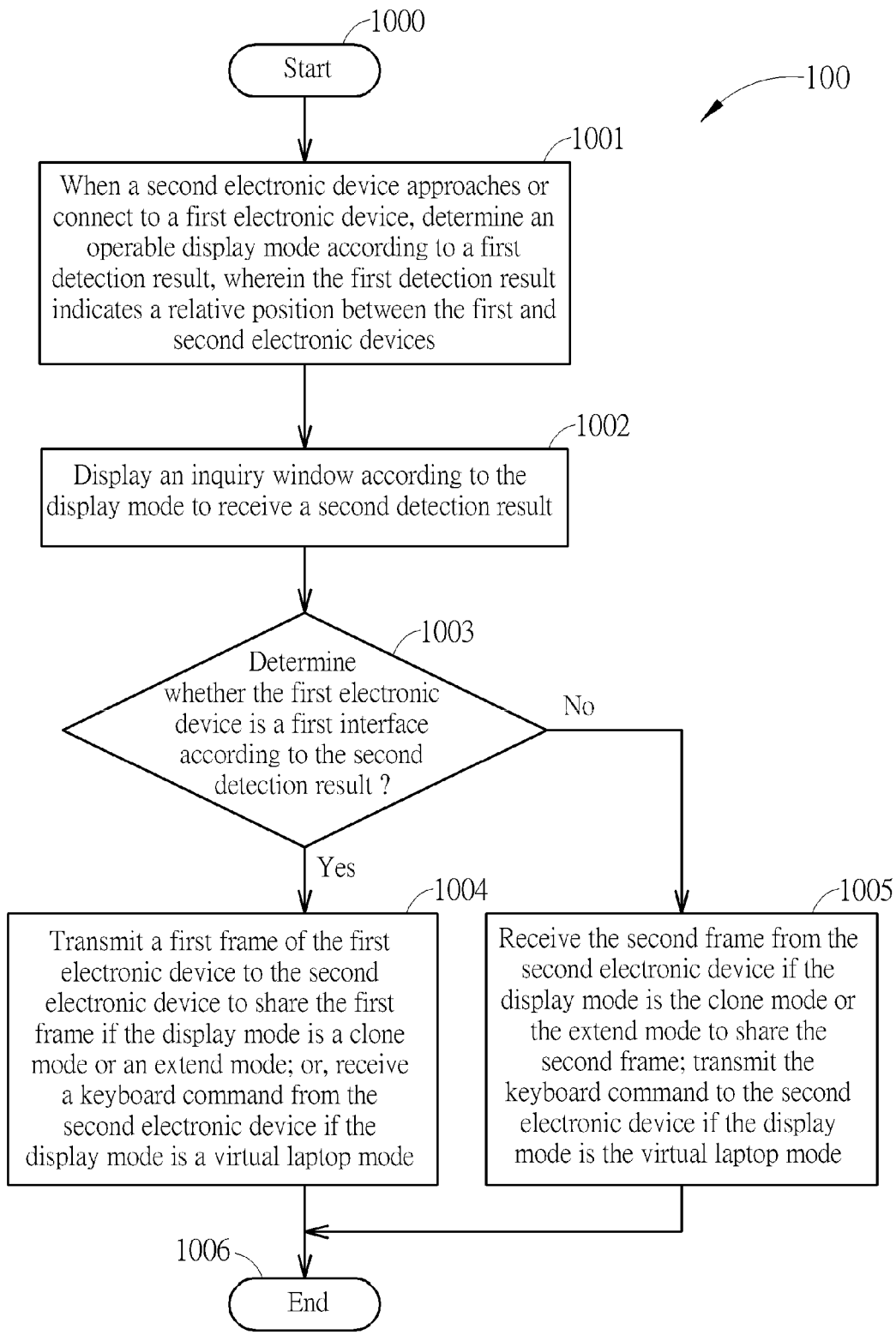
FIG. 10 is a flow chart of a simplified process according to an embodiment of the present invention.

Noticeably, the central processing unit of the tablet computer may determine a relative position and a combination between itself and another tablet computer and the corresponding display mode according to a first detection result generated by position detectors and a second detection result generated by the touch display once the function of interactive frames is activated by users. Therefore, the process of interacting frames 90 may be further simplified to be a process of interacting frames 100. Please refer to FIG. 10, which illustrates a flow chart of the process of interacting frames 100 according to an embodiment of the present invention. The process of interacting frames 100 may be complied into a program code and include the following steps.

Step 1000: Start.

Step 1001: When a second electronic device approaches or connect to a first electronic device, determine an operable display mode according to a first detection result, wherein the first detection result indicates a relative position between the first and second electronic devices.

Step 1002: Display an inquiry window according to the display mode to receive a second detection result.

Step 1003: Determine whether the first electronic device is a first interface according to the second detection result. Go to Step 1004 if yes; Go to Step 1005 if no.

Step 1004: Transmit a first frame of the first electronic device to the second electronic device to share the first frame if the display mode is a clone mode or an extend mode; or, receive a keyboard command from the second electronic device if the display mode is a virtual laptop mode. End.

Step 1005: Receive the second frame from the second electronic device if the display mode is the clone mode or the extend mode to share the second frame; transmit the keyboard command to the second electronic device if the display mode is the virtual laptop mode.

Step 1006: End.

In Step 1004, when the display mode is the clone mode or extend mode and the first electronic device is the first interface (i.e., a dominant frame or interface), the first electronic device may transmit the first frame to the second electronic device to copy the first frame to the second electronic device, so as to display the first frame together or simultaneously display the first frame. On the other hand, when the display mode is the virtual laptop mode, the first electronic device is the first interface (i.e., working as the display device), and the second electronic device is a second interface (i.e., working as the virtual keyboard), the first electronic device may receive the keyboard command from the second electronic device, which may be regarded as the first electronic device connecting to an external keyboard.

In Step 1005, when the display mode is the clone mode or the extend mode and the first electronic device is not the first interface (i.e., a submissive frame or interface), the first electronic device may receive the second frame from the second electronic device to copy the second frame to the first electronic device, so as to display the second frame together or simultaneously display the second frame. On the other hand, when the display mode is the virtual laptop mode, the first electronic device is not the first interface (i.e., working as the virtual keyboard) and the second electronic device is the first interface (i.e., working as the display device), the first electronic device may transmit the keyboard command to the second electronic device, which may be regarded as the second electronic device connecting to an external keyboard.

Detailed descriptions for operations regarding the process of interacting frames 100 may be obtained by referring to embodiments as mentioned above, which is omitted.

To sum up, the present invention disposes multiple position detectors at sides or bezels of the tablet computers for generating detection results when the tablet computers approach or connect to each other, so the tablet computers may determine a combination (or relative position) of themselves according to the detection results to select one of the display modes (e.g., the extent, clone and virtual laptop modes). The size of the frame that the tablets computer can display may be effectively increased by using the extend mode, which mitigates the visual fatigue to the users due to the small frame. In addition, the frame may be shared by using the clone mode. Or, a laptop computer may be achieved by combining the two tablet computers, which brings convenience to the users for typing and documentation. The two tablet computers may cooperate and interact with each other to share frames, which brings convenience to the users, mitigates the visual fatigue, and facilitates sharing information when using the tablet computer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of interacting frames between multiple electronic devices for a first electronic device, comprising:
    detecting, by a plurality of position detection units on the first electronic device, a second electronic device and a relative orientation between a first display of the first electronic device and a second display of the second electronic device;
    determining that the first electronic device is operated in an extend mode when the relative orientation indicates that the first display of the first electronic device and the second display of the second electronic device both face a same direction;
    determining that the first electronic device is operated in a clone mode when the relative orientation indicates that the first display of the first electronic device and the second display of the second electronic device face opposite directions;
    determining which one of a first frame of the first display of the first electronic device and a second frame of the second display of the second electronic device is a dominant frame;
    displaying a first portion of a first frame of the first electronic device on the first display and sharing a second portion of the first frame to the second electronic device to display on the second display when the first frame is the dominant frame and the first electronic device is operated in the extend mode;
    receiving a first portion of the second frame from the second electronic device to display the first frame on the first display when the second frame is the dominant frame and the first electronic device is operated in the extend mode;
    copying the first frame to the second electronic device to display the first frame synchronously on the second display when the first frame is the dominant frame and the first electronic device is operated in the clone mode: and
    receiving the second frame from the second electronic device to display the second frame on the first display when the second frame is the dominant frame and the first electronic device is operated in the clone mode.

2. The method of claim 1, further comprising:
    determining the first electronic device is operated in an independent mode when the second electronic device is not detected by the plurality of position detection units on the first electronic device, wherein the plurality of position detection units detects at least one of an approach and a contact of the second electronic device.

3. The method of claim 1, wherein displaying the first portion of the first frame of the first electronic device on the first display and sharing the second portion of the first frame to the second electronic device to display on the second display when the first frame is the dominant frame and the first electronic device is operated in the extend mode comprises:
dividing the first frame into the first portion and the second portion; and transmitting the second portion to the second electronic device to display on the second display, and the first frame is collaboratively displayed by the first and second electronic devices.

4. The method of claim 1, wherein receiving the first portion of the second frame from the second electronic device to display the first frame on the first display when the second frame is the dominant frame and the first electronic device is operated in the extend mode comprises:
receiving and display the first portion of the second frame from the second electronic device to share the second frame to the first electronic device;
wherein the second frame comprises the first portion and a second portion, the second electronic device displays the second portion of the second frame when the first electronic device displays the first portion of the first frame, and the second frame is collaboratively displayed by the first and second electronic devices.

5. The method of claim 1, wherein copying the first frame to the second electronic device to display the first frame synchronously on the second display when the first frame is the dominant frame and the first electronic device is operated in the clone mode comprises:
transmitting the first frame to the second electronic device, so that the second electronic device simultaneously displays the first frame with the first electronic device, so as to share the first frame to the second electronic device.

6. The method of claim 1, wherein receiving the second frame from the second electronic device to display the second frame on the first display when the second frame is the dominant frame and the first electronic device is operated in the clone mode comprises:
receiving and displaying the second frame from the second electronic device to share the second frame of the second electronic device to the first electronic device.

7. The method of claim 1, wherein determining that the first electronic device is operated in the extend mode when the relative orientation indicates that the first display of the first electronic device and the second display of the second electronic device both face the same direction, further comprises:
determining that the first electronic device is operated in a virtual laptop mode when an angle between the first frame and the second frame is detected by the plurality of position detection units on the first electronic device;
determining which one of the first frame of the first display of the first electronic device and the second frame of the second display of the second electronic device works as a display device;
displaying the first frame of the first electronic device when the first frame of the first display of the first electronic device works as the display device; and displaying a virtual keyboard on the first frame of the first electronic device when the second frame of the second display of the second electronic device works as the display device.

8. The method of claim 7, wherein determining the first electronic device is operated in the virtual laptop mode when the angle between the first frame and the second frame is detected by the plurality of position detection units on the first electronic device comprises:
determining the first electronic device is not operated in the virtual laptop mode when the plurality of position detection units on the first electronic device detect that the first frame and the second frame lie in a same horizontal level: and
determining the first electronic device is operated in the virtual laptop mode when the plurality of position detection units on the first electronic device detect that the first frame and the second frame lie in different horizontal levels.

9. An electronic system, comprises:
a first electronic device having a first display to display a first frame;
a plurality of position detection units disposed on the first electronic device to detect a second electronic device and a relative orientation between a first display of the first electronic device and a second display of the second electronic device;
a processor disposed on the first electronic device and configured to execute a process comprising the following instructions;
determining that the first electronic device is operated in an extend mode when the relative orientation indicates that the first display of the first electronic device and the second display of the second electronic device both face a same direction;
determining that the first electronic device is operated in a clone mode when the relative orientation indicates that the first display of the first electronic device and the second display of the second electronic device face opposite directions;
determining which one of a first frame of the first display of the first electronic device and a second frame of the second display of the second electronic device is a dominant frame;
displaying a first portion of a first frame of the first electronic device on the first display and sharing a second portion of the first frame to the second electronic device to display on the second display when the first frame is the dominant frame and the first electronic device is operated in the extend mode;
receiving a first portion of the second frame from the second electronic device to display the first frame on the first display when the second frame is the dominant frame and the first electronic device is operated in the extend mode;
copying the first frame to the second electronic device to display the first frame synchronously on the second display when the first frame is the dominant frame and the first electronic device is operated in the clone mode; and
receiving the second frame from the second electronic device to display the second frame on the first display when the second frame is the dominant frame and the first electronic device is operated in the clone mode.

10. The electronic system of claim 9, wherein the process further comprises:

determining the first electronic device is operated in an independent mode when the second electronic device is not detected by the plurality of position detection units on the first electronic device.

11. The electronic system of claim 9, wherein displaying the first portion of the first frame of the first electronic device on the first display and sharing the second portion of the first frame to the second electronic device to display on the second display when the first frame is the dominant frame and the first electronic device is operated in the extend mode comprises:
dividing the first frame into the first portion and the second portion; and transmitting the second portion to the second electronic device to display on be-the second display, and the first frame is collaboratively displayed by the first and second electronic devices.

12. The electronic system of claim 9, wherein receiving the first portion of the second frame from the second electronic device to display the first frame on the first display when the second frame is the dominant frame and the first electronic device is operated in the extend mode comprises:
receiving and display the first portion of the second frame from the second electronic device to share the second frame to the first electronic device;
wherein the second frame comprises the first portion and a second portion, the second electronic device displays the second portion of the second frame when the first electronic device displays the first portion of the first frame, and the second frame is collaboratively displayed by the first and second electronic devices.

13. The electronic system of claim 9, wherein copying the first frame to the second electronic device to display the first frame synchronously on the second display when the first frame is the dominant frame and the first electronic device is operated in the clone mode comprises:
transmitting the first frame to the second electronic device, so that the second electronic device simultaneously displays the first frame with the first electronic device, so as to share the first frame to the second electronic device.

14. The electronic system of claim 9, wherein receiving the second frame from the second electronic device to display the second frame on the first display when the second frame is the dominant frame and the first electronic device is operated in the clone mode comprises:
receiving and displaying the second frame from the second electronic device to share the second frame of the second electronic device to the first electronic device.

15. The electronic system of claim 9, wherein determining that the first electronic device is operated in the extend mode when the relative orientation indicates that the first display of the first electronic device and the second display of the second electronic device both face the same direction, further comprises:
determining that the first electronic device is operated in a virtual laptop mode when an angle between the first frame and the second frame is detected by the plurality of position detection units on the first electronic device;
determining which one of the first frame of the first display of the first electronic device and the second frame of the second display of the second electronic device works as a display device;
displaying the first frame of the first electronic device when the first frame of the first display of the first electronic device works as the display device; and
displaying a virtual keyboard on the first frame of the first electronic device when the second frame of the second display of the second electronic device works as the display device.

16. The electronic system of claim 15, wherein determining the first electronic device is operated in the virtual laptop mode when the angle between the first frame and the second frame is detected by the plurality of position detection units on the first electronic device comprises:
determining the first electronic device is not operated in the virtual laptop mode when the plurality of position detection units on the first electronic device detect that the first frame and the second frame lie in a same horizontal level; and
determining the first electronic device is operated in the virtual laptop mode when the plurality of position detection units on the first electronic device detect that the first frame and the second frame lie in different horizontal levels.

17. The electronic system of claim 9, wherein the first electronic device comprises:
a position detection module, comprising the plurality of position detection units respectively disposed at a plurality of sides of the first electronic device, for generating a detection result indicating at least one of an approach and a contact of the second electronic device, wherein each of the plurality of position detection units comprises:
two first position detectors disposed adjacent to the first display; and
two second position detectors disposed adjacent to a back cover of the first electronic device.

18. The electronic system of claim 17, wherein the first and second position detectors is one of a connector and a proximity sensor with one of a type of capacitive, magnetic, photoelectric, and sonar proximity sensors.

19. The electronic system of claim 17, wherein the first position detectors is one of a connector and a proximity sensor with one of a type of capacitive, magnetic, photoelectric, and sonar proximity sensors, and the second position detectors is one of a G-sensor and a gyroscope for detecting a horizontal level of the first electronic device.

20. The electronic system of claim 17, wherein a data transmission port is disposed at least one of the plurality of sides, and the data transmission port is coupled to a communication module for making a wired communication connection, wherein the wired connection is achieved by one of universal serial bus (USB) and Ethernet; and the communication module is a wireless communication module for making a wireless communication connection, wherein the wireless connections is achieved by one of Ultra Wide Band (UWB), Bluetooth, Wi-Fi and infrared-ray technology.

* * * * *